United States Patent
Ljungberg et al.

(10) Patent No.: US 10,140,519 B2
(45) Date of Patent: Nov. 27, 2018

(54) GENERATING A SUMMARY VIDEO SEQUENCE FROM A SOURCE VIDEO SEQUENCE

(71) Applicant: Axis AB, Lund (SE)

(72) Inventors: Christian Ljungberg, Malmö (SE); Erik Nilsson, Färjestaden (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/602,222

(22) Filed: May 23, 2017

(65) Prior Publication Data
US 2017/0337429 A1    Nov. 23, 2017

(30) Foreign Application Priority Data
May 23, 2016   (EP) .................................... 16170805

(51) Int. Cl.
*H04N 5/93*    (2006.01)
*G06K 9/00*    (2006.01)
(Continued)

(52) U.S. Cl.
CPC ....... *G06K 9/00751* (2013.01); *G06K 9/4604* (2013.01); *G06T 7/11* (2017.01);
(Continued)

(58) Field of Classification Search
CPC .... G06K 9/00751; G06K 9/4604; G06T 7/11; G11B 27/031; G11B 27/28; G11B 27/02
(Continued)

(56) References Cited

U.S. PATENT DOCUMENTS 5,185,667 A    2/1993   Zimmermann
5,649,032 A    7/1997   Burt et al.
(Continued)

FOREIGN PATENT DOCUMENTS

CN    103617234 A    3/2014
CN    103778237 A    5/2014
(Continued)

OTHER PUBLICATIONS

Atzori et al. "A Spatio-Temporal Concealment Technique Using Boundary Matching Algorithm and Mesh-Based Warping (BMA-MBW)," IEEE Transactions on Multimedia, vol. 3, No. 3, (Sep. 2001).
(Continued)

*Primary Examiner* — Helen Shibru
(74) *Attorney, Agent, or Firm* — Volpe and Koenig, P.C.

(57) ABSTRACT

A method for generating a summary video sequence from a source video sequence is disclosed. The method comprises: identifying, in the source video sequence, event video sequences, wherein each event video sequence comprises consecutive video frames in which one or more objects of interest are present; extracting, from video frames of one or more event video sequences of the event video sequences, pixels depicting the respective one or more objects of interest; while keeping spatial and temporal relations of the extracted pixels as in the source video sequence, overlaying the extracted pixels of the video frames of the one or more event video sequences onto video frames of a main event video sequence of the event video sequences, thereby generating the summary video sequence. A video processing device configured to generate the summary video sequence is also disclosed.

14 Claims, 5 Drawing Sheets

(51) Int. Cl.
*G06T 7/11* (2017.01)
*G06K 9/46* (2006.01)
*G11B 27/02* (2006.01)
*G11B 27/031* (2006.01)
*G11B 27/28* (2006.01)

(52) U.S. Cl.
CPC ............ *G11B 27/02* (2013.01); *G11B 27/031* (2013.01); *G11B 27/28* (2013.01); *G06T 2207/30204* (2013.01)

(58) Field of Classification Search
USPC ................................ 386/278, 290, 241, 287
See application file for complete search history.

(56) References Cited

U.S. PATENT DOCUMENTS

| | | | |
|---|---|---|---|
| 6,320,624 | B1 | 11/2001 | Ayer et al. |
| 6,411,339 | B1 | 6/2002 | Akutsu et al. |
| 6,654,019 | B2 | 11/2003 | Gilbert et al. |
| 7,688,349 | B2 | 3/2010 | Flickner et al. |
| 7,843,510 | B1 | 11/2010 | Ayer et al. |
| 8,675,021 | B2 | 3/2014 | Reusens et al. |
| 2004/0017504 | A1 | 1/2004 | Prandoni et al. |
| 2006/0117356 | A1* | 6/2006 | Jojic ................. G06F 17/30811 725/88 |
| 2010/0092037 | A1* | 4/2010 | Peleg ................. G06F 17/3079 382/103 |
| 2012/0027371 | A1 | 2/2012 | Hackett et al. |
| 2013/0081082 | A1 | 3/2013 | Riveiro Insua et al. |
| 2013/0121664 | A1 | 5/2013 | Chung et al. |
| 2013/0163961 | A1 | 6/2013 | Wu et al. |
| 2013/0166711 | A1 | 6/2013 | Wang et al. |
| 2015/0104149 | A1* | 4/2015 | Sim ...................... G11B 27/031 386/241 |
| 2015/0127626 | A1 | 5/2015 | Park et al. |

FOREIGN PATENT DOCUMENTS

| | | |
|---|---|---|
| EP | 2 884 423 A2 | 6/2015 |
| WO | 2008/093321 A1 | 8/2008 |

OTHER PUBLICATIONS

Bartoli et al., "Motion Panoramas," Computer Animation and Virtual Worlds, vol. 15, Issue 5 (2004).
Bennett et al., "Proscenium: A Framework for Spatio-Temporal Video Editing," Proceedings of the eleventh ACM international conference on Multimedia, ACM (2003).
Caspi et al., "Spatio-temporal alignment of sequences." IEEE Transactions on Pattern Analysis and Machine Intelligence, vol. 24, No. 11 (2002).
Gelgon et al., "Determining a Structured Spatio-Temporal Representation of Video Content for Efficient Visualization and Indexing," Proc 5th European Conference on Computer Vision (Jun. 1998).
Groves, "Video Sculpture: Spatio-Temporal Warping," (Dec. 2003).
Irani et al., "Mosaic based representations of video sequences and their applications," Proceedings of IEEE International Conference on Computer Vision, Cambridge, MA, (1995).
Rav-Acha et al., "Mosaicing with Parallax using Time Warping," 2004 Conference on Computer Vision and Pattern Recognition Workshop (2004).
Vendula, "Image Based Spatio-Temporal Modeling and View Interpolation of Dynamic Events," (Sep. 2001).
Wang et al., "Seamless Video Editing," Mitsubishi Electric Research Laboratories, Inc. (Aug. 2004).
Wang et al., "Spatio-Temporal Segmentation of Video Data," M.I.T. Media Laboratory Vision and Modeling Group, Technical Report No. 262 (Feb. 1994). Appears in Proceedings of the SPIE: Image and Video Processing II, vol. 2182, San Jose (Feb. 1994).
Zhang et al., "Segmentation of moving objects in image sequence: A review," Circuits, systems, and signal processing, 20, No. 2 (2001).
Zhong et al., "Detecting Unusual Activity in Video," Proceedings of the 2004 IEEE Computer Society Conference on Computer Vision and Pattern Recognition (Jun. 2004).
"Dynamic Video Collage", (DVC) Wang et al., IEEE International Conference on Multimedia & Expo., Beijing, China, pp. 1479-1482 (2007).
EP 16 17 0805.2 European Search Report (dated Nov. 29, 2016).

* cited by examiner

GENERATING A SUMMARY VIDEO SEQUENCE FROM A SOURCE VIDEO SEQUENCE

FIELD OF INVENTION

The invention relates to generating a summary video sequence from a source video sequence.

BACKGROUND

Looking through video recordings, especially monitoring video recordings, is a time consuming task. As of now it is common to manually look through recorded surveillance video material to find specific events that appear in the video recording. Looking through the video recordings for a specific event without knowing the exact time of the event will take a significant amount of time. One way to speed up the process of looking through the video recordings is to increase the playback speed. The playback may e.g. be increased by increasing the rate at which the video frames are shown to a viewer or by skipping video frames in the video sequence. By either of these approaches there is a risk of missing out of what is important due to the high speed, and frames skipped, of the playback. Another way to speed up the process of looking through of the video recordings is to use several windows or monitors to look through different portions of the video recordings simultaneously. However, this method is limited to only a few simultaneous displayed video recording portions since it is difficult to keep track of all events showing when the number of video recording portions increase.

Hence, there is a need for improved methods of reducing the time needed to look through video recordings, especially monitoring video recordings.

SUMMARY

A method and apparatus for generating a summary video sequence from a source video sequence is disclosed. The method and apparatus provides improvements in reducing the time needed to look through video recordings.

According to a first aspect a method for generating a summary video sequence from a source video sequence is provided. The method comprising: identifying, in the source video sequence, event video sequences, wherein each event video sequence comprises consecutive video frames in which one or more objects of interest are present; extracting, from video frames of one or more event video sequences of the event video sequences, pixels depicting the respective one or more objects of interest; while keeping spatial and temporal relations of the extracted pixels as in the source video sequence, overlaying the extracted pixels of the video frames of the one or more event video sequences onto video frames of a main event video sequence of the event video sequences, thereby generating the summary video sequence.

Hence, in the summary video sequence objects of interest from two or more passages of the source video sequence are overlaid on top of each other. Time periods where no objects of interest are present in the source video sequence may be completely disregarded in the summary video sequence. The resulting summary video sequence will hence be shorter in time than the source video sequence. The playback time may even be considerably shorter depending on the type of scene and how the rules governing the overlay of video sequences are configured. An advantage with the present method is that mutual temporal and spatial relationship between two or more objects of interest being present at the same time in the source video sequence will be kept in the generated summary video sequence. Hence, the objects of interest present in the source video sequence will keep their mutual temporal and spatial relationships also in the generated summary video sequence. Thus, objects of interest that are concurrent in the source video sequence will also be concurrent in the summary video sequence. This will improve the understanding of concurrent actions that the objects of interest might be involved in for the operator viewing the summary video sequence. This will also ease the demands on the complexity of the identification of the objects of interest. If for example an object and its shadow are identified as two separate objects of interest they will at least be shown with the same temporal and spatial relationship as in the source video sequence. If objects of interest are interacting with each other. e.g. handing packages to each other or talking to each other. these events will also be kept with their original temporal and spatial relationship.

The main event video sequence may be different from the one or more event video sequences.

The act of overlaying may be subjected to a rule of keeping the number of objects of interest being present in each frame of the summary video sequence below a predetermined maximum number.

The act of overlaying may be subjected to a rule of keeping a number of temporal and spatial collisions between objects of interests from different event video sequences below a predetermined maximum number. Wherein the different event video sequences are any of the main event video sequence and the one or more event video sequences.

The method may further comprise marking the objects of interest in the summary video sequence, wherein objects of interest from a first event video sequence are marked differently than objects of interest from a second event video sequence, wherein the first and second event video sequences are different event video sequences. The first event video sequence may be any of the main event video sequence and the one or more event video sequences. The second event video sequence may be any of the main event video sequence and the one or more event video sequences.

The marking may comprise an outline enclosing pixels of the object of interest, wherein the outlines of objects of interest from the first event video sequence are different from the outlines of objects of interest from the second event video sequence.

The act of overlaying may be performed by blending pixel data from the extracted pixels of the video frames of the one or more event video sequences with pixel data of video frames of the main event video sequence.

The method may further comprise identifying objects of interest in the source video sequence by motion detection and/or object type detection.

The one or more event video sequences may be subsequent to the main event video sequence in the source video sequence.

The act of overlaying may further comprise the rule of keeping the same chronological order of the starting points of the event video sequences in the summary video sequence as in the source video sequence.

The act of overlaying may be performed by overlaying the extracted pixels of the video frames of the one or more event video sequences onto complete video frames of the main event video sequence.

The method may further comprise simultaneously generating a plurality of sub source video sequences, wherein the source video sequence comprises the plurality of sub source video sequences, wherein each event video sequence comprises a plurality of sub event video sequences, wherein each of the plurality of sub event video sequences comprises video frames from a corresponding one of the sub source video sequences, wherein the act of identifying a specific event video sequence is performed as long as there are one or more objects of interest in at least one of the sub source video sequences.

Further a non-transitory computer readable recording medium is provided. The non-transitory computer readable recording medium having computer readable program code recorded thereon which when executed on a device having processing capability is configured to perform the method above.

According to a second aspect a video processing device configured to generate a summary video sequence from a source video sequence is provided. The video processing device comprising: an event video sequence identifier module configured to identify, in the source video sequence, event video sequences, wherein each event video sequence comprises consecutive video frames in which one or more objects of interest are present; an object extractor module configured to extract, from video frames of one or more event video sequences of the event video sequences, pixels depicting the respective one or more objects of interest; and a video frame renderer module configured to, while keeping spatial and temporal relations of the extracted pixels as in the source video sequence, overlaying the extracted pixels of the video frames of the one or more event video sequences onto video frames of a main event video sequence of the event video sequences, thereby generating the summary video sequence.

The above mentioned features of the method, when applicable, apply to this second aspect as well. In order to avoid undue repetition, reference is made to the above.

A further scope of applicability of the method and apparatus for generating a summary video sequence from a source video sequence will become apparent from the detailed description given below. However, it should be understood that the detailed description and specific examples, while indicating embodiments, are given by way of illustration only, since various changes and modifications within the scope of the method and apparatus for generating a summary video sequence from a source video sequence will become apparent to those skilled in the art from this detailed description.

Hence, it is to be understood that the method and apparatus for generating a summary video sequence from a source video sequence is not limited to the particular component parts of the device described or steps of the methods described as such device and method may vary. It is also to be understood that the terminology used herein is for purpose of describing particular embodiments only, and is not intended to be limiting. It is noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

A more detailed understanding may be had from the following description, given by way of example in conjunction with the accompanying drawings where:

FIG. 1 illustrates the number of concurrent objects of interest as a function of time of a source video sequence comprising two different event video sequences with an idle video sequence in between;

As illustrated in the figures, the sizes of layers and regions are exaggerated for illustrative purposes and, thus, are provided to illustrate the general structures of embodiments. Like reference numerals refer to like elements throughout.

DETAILED DESCRIPTION

Figure 1:
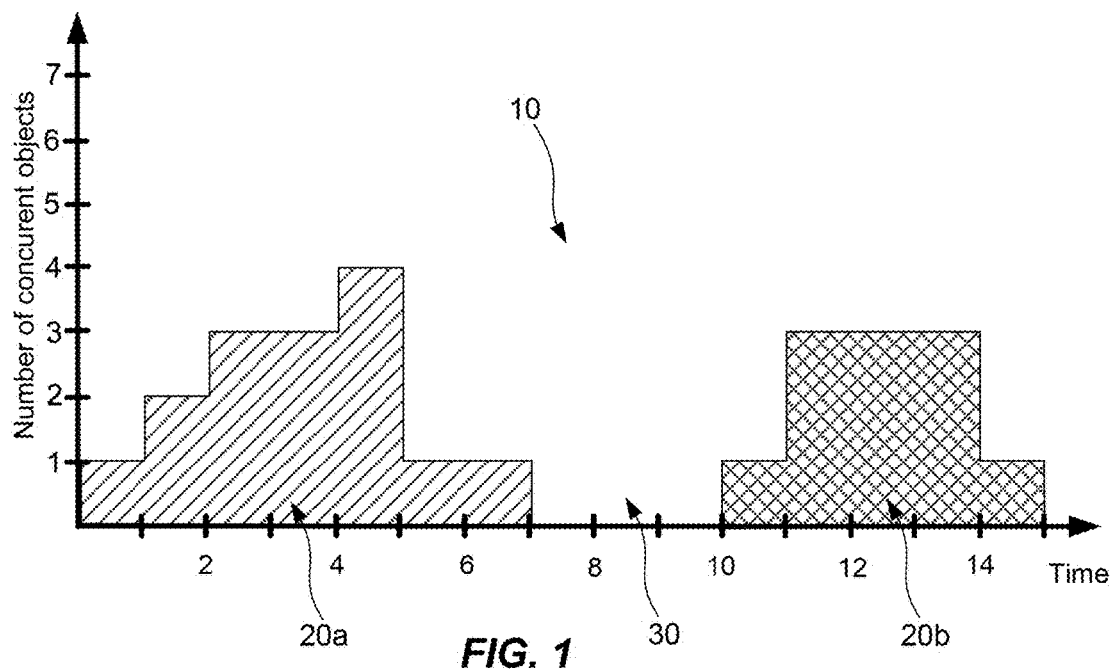

The method and apparatus for generating a summary video sequence from a source video sequence will now be described more fully hereinafter with reference to the accompanying drawings, in which embodiments of the are shown. The method and apparatus for generating a summary video sequence from a source video sequence may, however, be embodied in many different forms and should not be construed as limited to the embodiments set forth herein; rather, these embodiments are provided for thoroughness and completeness, and to fully convey the scope of the embodiments to the skilled person.

As will be appreciated by one skilled in the art, aspects of the detailed description may be embodied as a device, method or computer program product. Accordingly, aspects of the detailed description may take the form of an entirely hardware embodiment, an entirely software embodiment (including firmware, resident software, micro-code, etc.) or an embodiment combining software and hardware. Furthermore, aspects of the detailed description may take the form of a non-transitory computer program product embodied in one or more computer readable medium(s) having computer readable program code embodied thereon.

The disclosed embodiments are based on the insight by the inventors that a summary video sequence may be generated. In the summary video sequence objects of interest from two or more passages of a source video sequence are overlaid on top of each other. Time periods where no objects of interest are present in the source video sequence may be completely disregarded in the summary video sequence. The resulting summary video sequence will hence be shorter in time than the source video sequence. The playback time may even be considerably shorter depending on the type of scene and how the rules governing the overlay of video sequences are configured.

The source video sequence is generated by a camera. The source video sequence is recorded at a video storage. The source video sequence may be recorded in an encoded version using any conventional method for video encoding.

In the source video sequence objects of interest are detected. Objects of interest may be objects of a specific type. Non-limiting examples of different types of objects are faces, humans, cars, license plates, etc. As an example the detection of objects of a specific type may be performed by analyzing the appearance, or appearance features of objects in the scene, such as by shape recognition. However, any conventional method for detecting objects of a specific type in a video sequence may be used and will thus not be discussed in more detail in this disclosure. Alternatively or in combination, object of interest may be objects moving in the scene depicted by the source video sequence. As an example the motion detection may be performed by comparing consecutive video frames, or comparing a video frame with a background image or model of the scene, to detect changes due to objects in motion. However, any conventional method for detecting moving objects in a video sequence, often referred to motion detection, may be used and will thus not be discussed in more detail in this disclosure.

In addition to detecting objects of interest, the detected objects of interest may also be tracked from video frame to video frame to further verify that they in fact are objects of interest.

Object(s) of interest may be described using object data. Object data of an object of interest may comprise any one of an object ID, information defining a position and size of the object (this information may e.g. be a bounding box), and a time stamp. The time stamp may comprise information about when the object of interest appears in the source video sequence. Alternatively or in combination, the time stamp may comprise information about when the object of interest disappears in the source video sequence. Alternatively or in combination, the time stamp may comprise information about the point in time in the source video when the other object data was detected. If detection of objects of a specific type is performed data describing the type of object may also be added to the object data. The object data may further comprise other appearance information such as color. The velocity of the object may also be calculated and added to the object data. The activity the object of interest is engaged in may also be added to the object data. Examples of activity the object of interest may be engaged in may e.g. be entering the scene, leaving the scene, loitering, depositing another object, removing another object, running, walking etc.

The object data may be packaged as data frames, corresponding to the video frames. The data frame may be describing all objects of interest, and their attributes, detected in the scene in the same video frame of the source video sequence. So the time stamp may really be the time stamp of the data frame, which enables synchronization with the source video sequence. The data frames may be stored as a metadata file comprising the object data. The meta data file is preferably attributed to the source video sequence.

The object data may be detected in real-time at the camera. Alternatively or in combination, the object data may be detected in real-time at a video processing device connected to the camera. Alternatively or in combination, the object data may be detected from the recorded source video sequence. In case of the recorded source video sequence being encoded video, the source video sequence may be decoded before performing the object detection. The detection of object data from the recorded source video sequence may be performed at the video processing device or at the camera. The video processing device or the camera may also be set to decode the encoded recorded source video sequence.

The object data may also be filtered in different ways. Some non-limiting examples of filtering of the object data will now be listed. Filtering object data based on object type, such as humans, cars, faces, etc. Filtering object data based on object attribute, such as a specific color, shape, being larger or smaller that a set threshold, etc. Filtering object data based on appearance in the scene, hence, location within the video frame, such a portion of the scene defined by an operator as a region of interest. Filtering object data based on activity, such as loitering, depositing, etc.

The object data itself or the filtered object data may be used for finding video sequences within the source video sequence comprising activity of interest. Since the object data or the filtered object data comprises information about when there is activity of interest present in the source video sequence, the object data also gives information on when there is no activity of interest in the source video sequence. The lack of activity of interest is referred to as idle time. It then follows that between two idle times there is a continuous video sequence with activity of interest present in the video sequence. Such continuous video sequences having activity of interest therein will be referred to as event video sequences. Hence, an event video sequence is a sequence of consecutive video frames in which there always is at least one object of interest detected in each frame. Preferably, the event video sequence is a sequence of consecutive video frames in which there, at least for some period of time, is at least two objects of interest detected in each frame. Of course a source video sequence might also start or end with an event video sequence, thereby having an event video sequence which is located in connection with only one idle video sequence.

In FIG. 1 an example of the number of concurrent objects of interest as a function of time of a source video sequence 10 comprising two different event video sequences 20a, 20b with an idle video sequence 30 in between is illustrated. Between time 0 and 7 a first "oldest" event video sequences 20a is present in the source video sequence 10. Between time 7 and 10 an idle video sequence is present in the source video sequence 10. Between time 10 and 15 a second "second oldest" event video sequence 20b is present in the source video sequence 10.

The event video sequences may be extracted from the source video sequence. The extraction of event video sequences is performed using the object data from the source video stream. A plurality of event video sequences may be extracted from the original video sequence.

Figure 2:
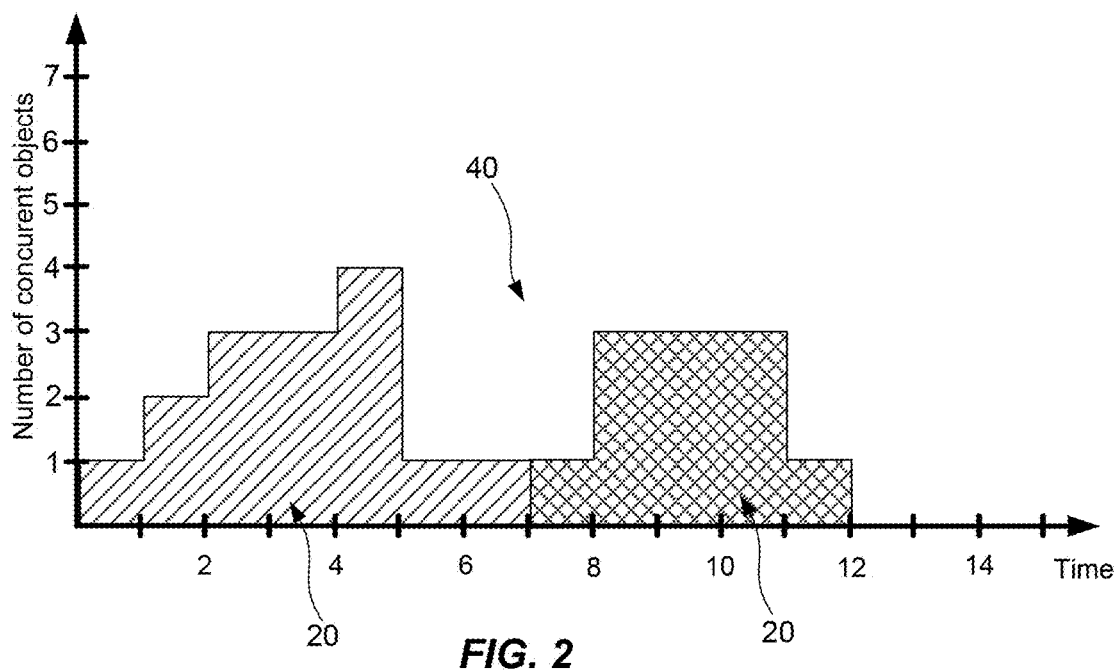
FIG. 2 illustrates the number of concurrent objects of interest as a function of time of a compressed video sequence of the source video sequence of FIG. 1.

By extracting the event video sequences a compressed video sequence may be formed. The compressed video sequence comprises the event video sequences one after the other, preferably in a chronological order, excluding all idle time. Hence, when producing the compressed video sequence, all the video frames of the source video sequence belonging to idle video sequences are excluded. In FIG. 2 a compressed video sequence 40 of the source video sequence 10 of FIG. 1 is illustrated. Between time 0 and 7 the first event video sequences 20a is present in the compressed video sequence 40. Between time 7 and 12 the second event video sequence 20b is present in the compressed video sequence 40.

In case the recorded source video sequence is encoded video the extraction of the event video sequences may be performed according to the following. The metadata file may be opened and loaded before any decoding is started. Alternatively, portions of the metadata file may be opened and loaded before the decoding is started. According to this alternative, a portion of the metadata file is handled in order to identify one or more event video sequences in the source video while other one or more event video sequences are extracted from the source video sequence based on another portion of the metadata file. For example, 10 event video sequences are identified using object data from a portion of the metadata file while another 10 event video sequences are extracted from the source video sequence based on already another portion of the metadata file used for identifying the another 10 event video sequences. The metadata is used to only decode video frames within an event video sequence. Optionally, the object data of the metadata file is filtered before any decoding is started. Thereby only video frames of the event video sequences need to be decoded. In other words only frames being associated with object(s) of interest is decoded. This may save processing time and processing power. Moreover, in the event video sequences not being attributed as the main event video sequence, see below, only the portions of the video frames which is identified by the object data may be decoded. This may further save processing time and processing power. For example only macro blocks referring to identified object areas may be decoded. This may be performed using standard decoding according to for example H.264 or other video coding standards. However, other portions of the video frame and other video frames may however also need to be decoded if there are temporal or spatial dependencies to other areas or video frames.

When generating the summary video sequence one of the event video sequences is used as a main event video sequence and will act as a background video sequence. According to one non-limiting example the oldest event video sequence is used as the main event video sequence. The main event video sequence is used as the background in the summary video sequence as the entire video frames from the main event video sequence are rendered to the summary video sequence.

Pixel data of pixels of the object(s) of interest is then extracted from one or more other of the event video sequences. The pixels of an object of interest are identified using the information defining a position and size of the object. Hence, according to one example the pixels of an object of interest may be identified using bounding box data of the object of interest. Pixel data surrounding the position and size of the objects of interest as defined by the object data may also be extracted in addition to the identified pixels of an object of interest. This in order to add a margin around the objects of interest ensuring that the whole visual appearances of the objects of interest are extracted. The extracted pixels are then overlaid, e.g. by blending, into the main event video sequence. The example of blending referring to adding a first percentage of a pixel value from a frame of the main event video sequence to a second percentage of pixel value extracted from another event video sequence. The first and second percentages adding to 100%. This may be expressed as: PixelValue_new=alpha*PixelValue_main+(1−alpha)*PixelValue_other. The overlaying of object(s) of interest is performed while keeping spatial and temporal relations of the extracted pixels within the event video sequences as in the source video sequence. Hence, all objects of interest within one and same event video sequence appear in the same relative space and time as in the source video sequence. For example, this means that if two objects of interest extracted in the same event video sequence appear with a 3 seconds interval in the source video sequence, they will still appear with the same 3 seconds interval in the summary video sequence, even if they are viewed as a future event and cut in.

The other event video sequences may e.g. be the second oldest event video sequence. Hence, objects present in two different, e.g. the oldest and the second oldest, video event sequences are concurrently present in the summary video sequence. In other words, objects of interest from different moments in time may be simultaneously presented in the summary video sequence, even though they appear at different times in the source video sequence. It is realized that object(s) of interest from more than one another of the event video sequences may be extracted and overlaying into the main event video sequence.

There may only be one main event video sequence at a time when rendering the summary video sequence. Pixel data of object(s) of interest from video frames of other event video sequences than the main event video sequence may be combined into a video frame of the main event video sequence upon rendering a video frame of the summary video sequence.

Figure 3:
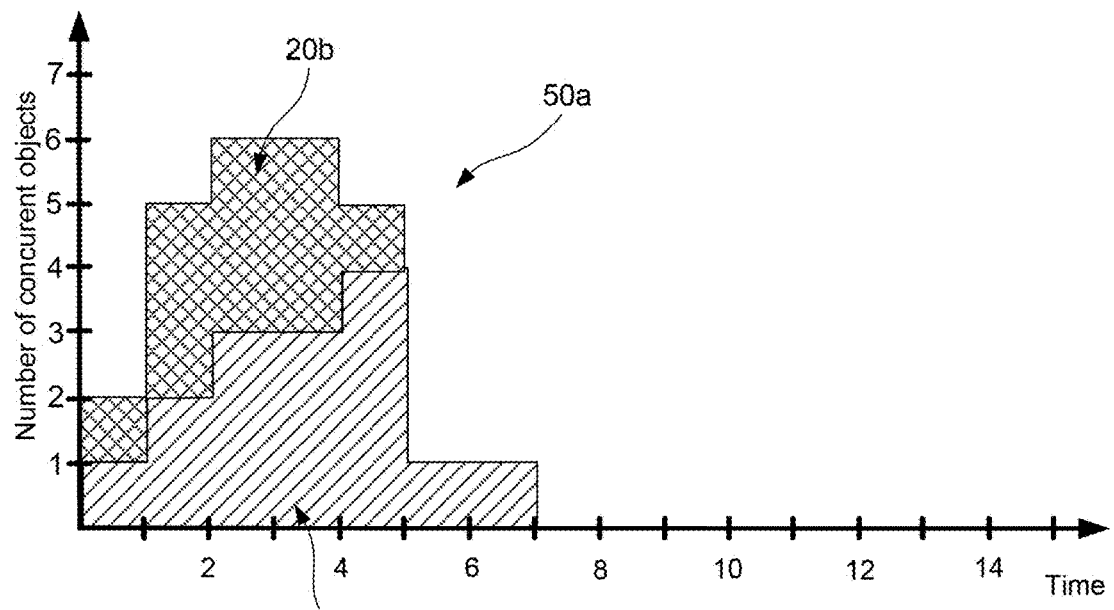
FIG. 3 illustrates the number of concurrent objects of interest as a function of time of an example of a summary video sequence of the source video sequence of FIG. 1.

In FIG. 3 an example of the number of concurrent objects of interest as a function of time of a summary video sequence 50a of the source video sequence 10 of FIG. 1 is illustrated. The first "oldest" event video sequence 20a is used as the main event video sequence. Between time 0 and 5 both event video sequences 20a, 20b of the source video sequence 10 are present in the summary video sequence 50a. Between time 5 and 7 only the first "oldest" event video sequence 20a is present in the summary video sequence 50a.

With the above discussed approach, a single display window may be used for simultaneously displaying two or more of the event video sequences. This makes it easy for an operator to keep focus on what is happening in the display window, and a plurality of objects of interest may be viewed simultaneously even if they do not appear at the same time in the source video sequence. Hence, the operator may watch a plurality of event video sequences simultaneously in the original playback speed, within the same viewing window.

Moreover, predetermined and/or configurable rules may govern how many event video sequences that may be included in the summary video sequence concurrently. The predetermined and/or configurable rules may also govern when in point in time the respective event video sequence is to be inserted in the main event video sequence.

For example a maximum limit may be set for the number of objects of interest that may be concurrent in a video frame of the summary video sequence. The maximum limit determines if an event video sequence may be added to the summary video sequence. The maximum limit also determines how many event video sequences that may be viewed simultaneously. When generating the summary video sequence event video sequences may be added to the main event video sequence as long as the maximum limit of the number of objects of interest that may be concurrent in a video frame of the summary video sequence is not violated at some point in time during the time when the event sequences are overlaid.

Figure 4:
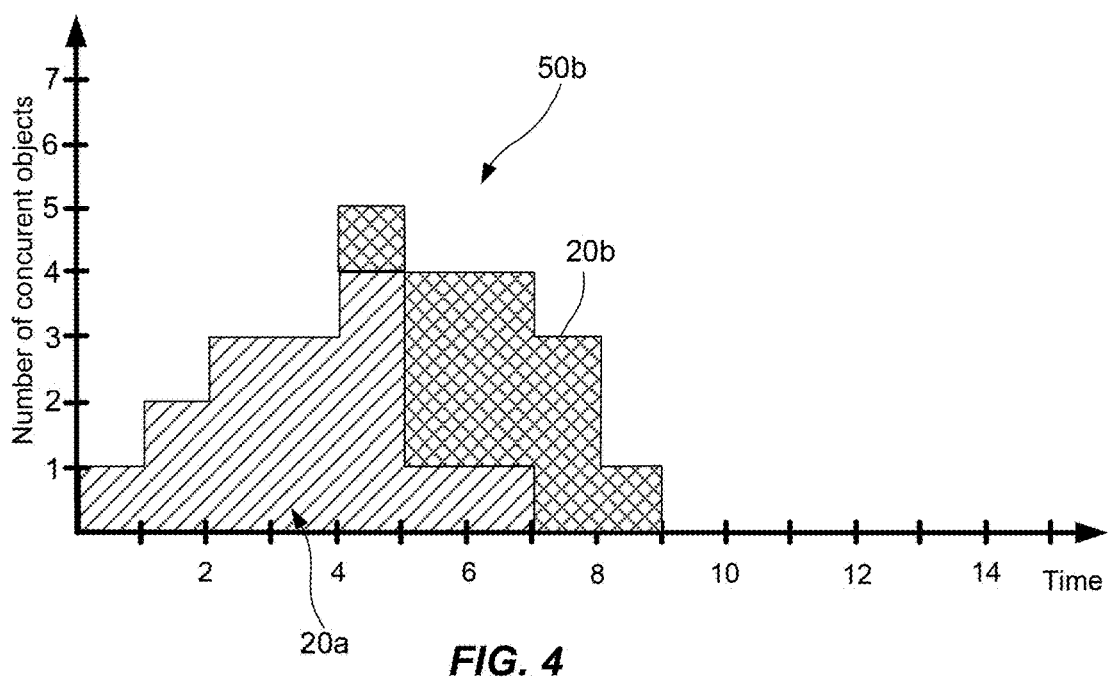
FIG. 4 illustrates the number of concurrent objects of interest as a function of time of yet an example of a summary video sequence of the source video sequence of FIG. 1.

This is exemplified in FIG. 4 wherein the maximum number of objects of interest that may be concurrent in a video frame of a summary video sequence 50b of the source video sequence of FIG. 1 is set to be 5. The first point in time when the two event video sequences are allowed be combined is in this example after time 4. Hence, due to this rule the second event video sequence could not be started to be overlaid into the first event video sequence until after time 4. As can be seen, the total number of concurrent objects of interest never exceeds the limit of 5 at any point. Between time 0 and 4 only the first event video sequence 20a is present in the summary video sequence 50*b*. Between time 4 and 7 both event video sequences 20*a*, 20*b* of the source video sequence 10 are present in the summary video sequence 50*b*. Between time 7 and 9 only the second event video sequence 20*b* is present in the summary video sequence 50*b*.

Figure 5:
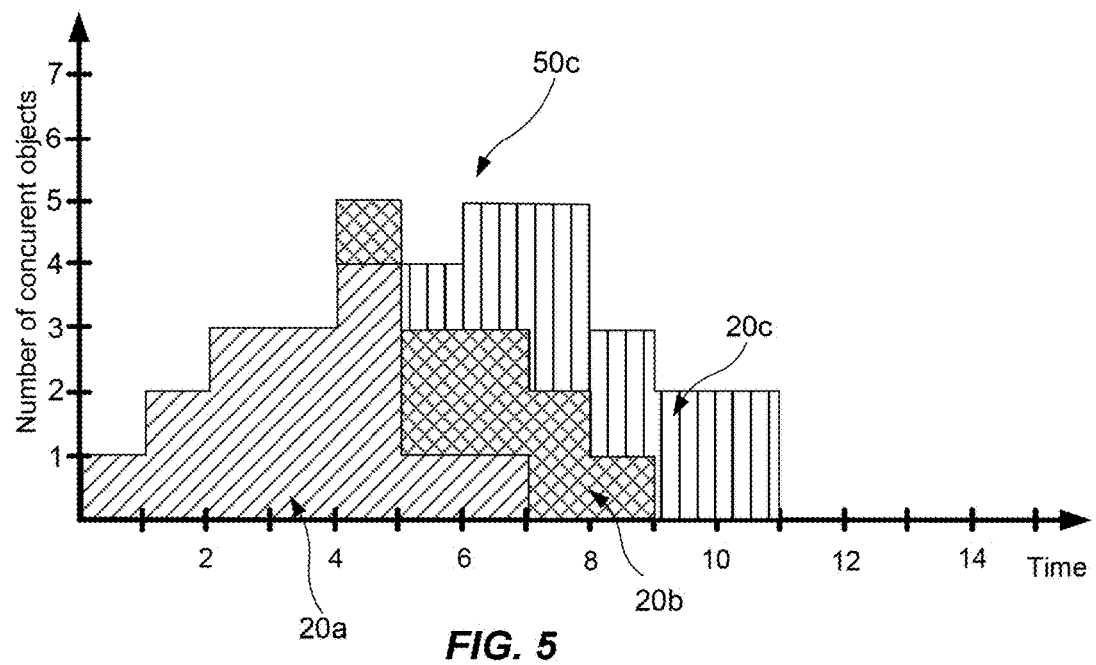
FIG. 5 illustrates an example where three event video sequences have been combined into a summary video sequence.

Hence, whether or not it is allowed to add an event video sequence to the main event video sequence of the summary video sequence is limited by the value set for the maximum number of concurrent objects of interest in the summary video sequence. After adding one event video sequence to the main event video sequence the process of adding event video sequences may be repeated until the limit of maximum concurrent objects of interest is reached. This allows several event video sequences to be added depending on the value chosen for the limit of maximum objects of interest. An example where three event video sequences 20*a*, 20*b*, 20*c* have been combined into a summary video sequence 50*c* is illustrated in FIG. 5. According to this example the source video sequence comprises three different event video sequences. Hence, three event video sequences 20*a*, 20*b* are combined into the summary video sequence 50*c*. Also for this exemplified summary video sequence 50*c* the maximum number of objects of interest that may be concurrent in a video frame of the summary video sequence 50*c* is set to be 5. The first point in time when the first and second event video sequences 20*a*, 20*b* are allowed be combined is in this example after time 4. Hence, due to this rule the second event video sequence could not be started to be overlaid into the first event video sequence until after time 4. The first point in time when the first, second and third event video sequences 20*a*, 20*b*, 20*c* are allowed be combined is in this example after time 5. As can be seen, the total number of concurrent objects of interest never exceeds the limit of 5 at any point. Between time 0 and 4 only the first event video sequence 20*a* is present in the summary video sequence 50*c*. Between time 4 and 5 the first and second event video sequences 20*a*, 20*b* of the source video sequence 10 are present in the summary video sequence 50*b*. Between time 5 and 7 the first, second and third event video sequences 20*a*, 20*b*, 20*c* are present in the summary video sequence 50*c*. Between time 7 and 9 the second and third event video sequences 20*b*, 20*c* are present in the summary video sequence 50*c*. Between time 9 and 11 only the third event video sequence 20*c* is present in the summary video sequence 50*c*.

Preferably, objects will never be excluded from any event video sequence. Hence, if the main event video sequence at some point contains more concurrent objects than the set maximum value, all objects will still be displayed as the main event video sequence always displays the source video sequence. Moreover, if the main event video sequence contains as many as or more concurrent objects of interest than the maximum limit of concurrent objects of interest, no new event video sequence is allowed to be added to the summary video sequence.

The event video sequences may, as in the examples discussed above, be added in a chronological order. Then the main event video sequence is always the event video sequence occurring first in time in the source video sequence (out of the event video sequences currently displayed in the summary video sequence). Each next event video sequence to be added is then according to this example always the first event in a queue based on the time the event video sequence appear in the source video sequence. If the next in time event video sequence cannot be added due to violation of any rule governing how many event video sequences that may be included in the summary video sequence concurrently, e.g. the limit of maximum concurrent objects of interest value condition, the next in time event video sequence will not be temporarily skipped and look for later event to fit in. Instead the process will wait until it reaches a point when the next event is allowed to be added. This makes adding the events chronologically consistent and brings a logical order in which the events are displayed in the summary video sequence. However in other embodiments there will be a temporary skip of the next in time event video sequence and a look for later event to fit in will be performed. Then the temporarily skipped event video sequence will still remain the event queue and be added at a later point.

In case the current main event video sequence reaches its end (i.e. the last object of interest in the main event video sequence disappears) a new event video sequence is selected as main event video sequence. An active event video sequence may be selected as the new main event video sequence. The oldest active event video sequence may be selected as the new main event video sequence. Objects of interest may hence be extracted from an active event video sequence during a first time period of its recorded time and when the main event video sequence on which its objects are overlaid upon finishes, it may be used as a new main event video sequence during a second time period of its recorded time. Alternatively, for example if there are no active event video sequences, a new event video sequence may be selected from the group of unplayed event video sequences as the main event video sequence. The new main event video sequence will now act as background as the entire video frames of this event video sequence now are being rendered.

The objects of interest in the summary video sequence may be highlighted by an outline outlining the individual objects of interest. Objects of interest from a specific event video sequence may have a specific type of outline. Examples of types of outlines that may be used are different colors and different kinds of dotted lines. This gives an indication of what event video sequence that an object of interest originally belongs to. According to a non-limiting example, the outline outlining an individual object of interest may be set by the bounding box describing the object of interest.

As a consequence of keeping the spatial and temporal relations of the extracted pixels when performing the overlaying, objects of interest having the same type of outline appear at the same temporal and spatial distance in the summary video sequence as in the source video sequence.

Next an example of how to render video frames of a summary video sequence will be discussed in connection with the help of pseudo code listed below:

```
1: while not ActiveEvents.Empty( ) AND not EventQueue.Empty( ) do
2:     if NextEvent = null AND not EventQueue.Empty( ) then
3:         NextEvent ← EventQueue.Front( )
4:         EventQueue.Pop( )
5:     SpawnTimer ← SpawnTimer + dt
6:     if NextEvent not null AND SpawnTimer > 1 then
7:         if (NextEvent + ActiveEvents) never exceeds MaxObjects then
8:             ActiveEvents.Add(NextEvent)
9:             NextEvent ← null
10:            SpawnTimer ← 0
11:    for (i ← 1; i < ActiveEvents.Size( ); i ← i + 1) do
12:        DecodedFrames[i] ← ActiveEvents[i].DecodeFrame( )
13:    OutputImage.Clear( )
14:    OutputImage.Render(DecodedFrames[1])
15:    for (I ← 2; i < ActiveEvents.Size( ); i ← i + 1) do
16:        OutputImage.CropAndRender(DecodedFrames[i])
17:    if OutputMode = Screen then
```

```
18:         OutputImage.Display( )
19:     else if OutputMode = File then
20:         OutputImage.Store( )
21:     for each event ∈ ActiveEvents do
22:         if event.Ended( ) then
23:             ActiveEvents.Remove(event)
```

All event video sequences (in the pseudo code called events) are identified with the help of the object data of the metadata file. The identified event video sequences are then stored in an event queue. The event queue may be chronological. As long as the event queue contains events video sequences or as long as there is at least one active event video sequence, a loop is running. If there is no next event video sequence stored, get the first event video sequence in the event queue and store it as the next event video sequence. In each loop, add a spawn timer with delta time. The spawn timer is used to avoid several event video sequences spawning at the very same time, reducing risks of overlapping objects. In this example the time offset between event video sequences spawning is set to 1 second. If there is a next event video sequence and spawn timer is more than 1 second, a check is made to find whether next event video sequence may be added without exceeding the limit of maximum concurrent objects of interest at any point. Of course it is realized that alternatively or in combination, other rules may also govern if the next event video sequence may be added or not. If this is allowed, then next event video sequence is added to an active events list. Then next event video sequence is set to null and the spawn timer is reset.

Video frames are decoded for each event video sequence and stored in a buffer. The output image is the video frame of the summary video sequence the image data is to be rendered to. First the main event video sequence frame is rendered, including the entire frame, to the output image. After that the corresponding frames of other event video sequences are rendered, but with the exception that not the whole frame is rendered only the objects of interest are cut out and rendered to the output image. The cut out objects of interest may be blended with the image data of the output image. This will make the cut in objects of interest appear partially transparent, while the objects of interest from the main event video sequence remain solid. When the output image is created it is either directly displayed at a screen or saved to an output summary video sequence file. Each event video sequence is then checked if their last frames have been rendered. If true, the event video sequence is removed from the active events list.

As discussed above the summary video sequence may be outputted as a summary video sequence file. As discussed above, alternatively or in combination, the summary video sequence may be outputted directly in real-time onto a display.

One relevant factor that decides if the summary video sequence is able to be produced in real-time is the number of event video sequences that needs to be combined. The different event video sequences need to be processed in parallel.

Since all event video sequences are from the same source video sequence, they all have the same frame rate. This makes it safe to assume that when one event video sequence is about to switch to the next video frame, so are all the other active event video sequences as well. Hence, all active event video sequences may update to a new video frame at the same time. However, in the case of the frame rate not being constant, the object data from the frame closest in time may be selected or alternatively an interpolated object data may be calculated from two frames.

When a new video frame of the summary video sequence is to be rendered, the following process, illustrated by the below pseudo code, may be performed:

```
1: Render the main event frame to an output image.
2: for each event ∈ RemainingEvents do
3:     for each Object ∈ Event.Objects( ) do
4:         TempSortList.Insert(Object)
5: Sort the TempSortList based on the bounding box area size.
6:     for each Object ∈ TempSortList do
7:         Retrieve the bounding box position data.
8:         Send the bounding box data to a GPU via a vertex buffer.
9:         Render the cut out object on top of the output texture.
10:        Render an outline around the object.
```

Hence, the objects of interest may be sorted based on size before they are rendered into the output image. For each object of interest in each frame, the bounding box area is calculated and then used as criteria for sorting the objects. In the above example the bounding box area is used for determining the size of an object of interest. However, it is realized that other ways of determining a size of an object of interest may also be used. The sorting based on size is done to increase the probability of making every object of interest as visible as possible if they overlap. The object of interest with the smallest bounding box area is rendered last, placing it on top of the others. Even though cut in objects of interest may be blended against the already rendered content in the output image, the overlapping object of interest will be more visible than the overlapped area. Therefore it may be favorable to render the smallest objects of interest on top, since bigger objects of interest will still be partially visible even if they are overlapped by a smaller object of interest.

According to this example a computer graphics shader receives the bounding box positions for each object in one of the vertex buffers and then converts the positions to the same coordinate system as an OpenGL texture coordinate system. The converted bounding box positions are then used as texture coordinates to only render the content contained by the bounding box. Note that the size of the output texture is unaltered so that the bounding box area is rendered at the exact position on the output image as in the original frame.

Figure 6:
FIG. 6 is a screenshot from a summary video sequence.

After an object has been rendered to the output texture the outline is rendered on top of it. In this example the bounding box outline is used as the outline. Hence, in the summary video sequence, object bounding box outlines are rendered for marking the objects of interest. As discussed above, the outline may e.g. be rendered in different colors depending on which event video sequence the object of interest belongs to. The idea of using color coded outlines is that it enables the user to easily distinguish objects from different event video sequences, and also immediately see which objects of interest that belong to the same event video sequence and thereby know that objects of interest with the same outline color also appeared at the same time in the source video sequence. In FIG. 6 a screenshot from a summary video sequence is shown. The screenshot demonstrate the use of different outline colors. In FIG. 6 there are two objects from the main event video sequence, namely the first and third cars driving on the road from right to left. In the screenshot these two objects of interest are marked with white outlines. The other two objects of interest are cut in from two separate event video sequences. The car driving on the road from left to right is marked with an orange outline and the middle car driving on the road from right to left is marked with a red outline.

Above one predetermined and/or configurable rule governing how many event video sequences that may be included in the summary video sequence concurrently was discussed, namely that a limit may be set for the number of objects of interest that may be concurrent in a video frame of the summary video sequence. Another predetermined and/or configurable rule governing how many event video sequences that may be included in the summary video sequence concurrently may be to set a limit for maximum number of spatial and temporal collisions between objects of interests from different event video sequences. That is counting the number of times objects of interest will, to at least some extent, be overlapping each other in the summary video sequence if an event video sequence is added to the summary video sequence. This predetermined and/or configurable rule may also govern when a respective event video sequence may be inserted.

Another predetermined and/or configurable rule governing how many event video sequences that may be included in the summary video sequence concurrently could be configured for the minimum allowed distance between objects of interest; this in order to make it easier for the operator watching the summary video sequence to spot objects of interest or interactions between object of interest. The closest distance between the object of interest's geometrical center of gravity of the bounding box or polygon surrounding an object of interest may be used for determining distance between objects of interest. This predetermined and/or configurable rule may also govern when a respective event video sequence may be inserted.

The above predetermined and/or configurable rules may be configured in real-time when the summary video sequence in generated and viewed by an operator. This enables the operator to adjust the rule parameters governing the generation of the summary video sequence. This may be performed when viewing a real time generated summary video sequence. For example the maximum number of concurrent objects may be decreased if the operator is worried that the scene is too crowded to notice what is important. The maximum number of concurrent objects may alternatively be increased if the operator wants to decrease the viewing time.

In connection with FIG. 7 a monitoring system 700 will be discussed. The monitoring system 700 comprises a video camera 710 and a video processing device 720. The video camera 710 is connected to the video processing device 720. The connection between the video camera 710 and the video processing device 720 allow for data transmission between the video camera 710 and the video processing device 720.

The video camera 710 is positioned such that a scene of interest is within a field of view 711. The video camera 710 is arranged for monitoring an indoor or outdoor room within the scene of interest. The video camera 710 operates to capture video frames of the scene of interest within the field of view 711. The video frames are representative of the source video sequence. The source video sequence may be stored in a memory of the video camera 710. Alternatively, or in combination the source video sequence may be stored in a memory 721 of the video processing device 720.

Figure 7:
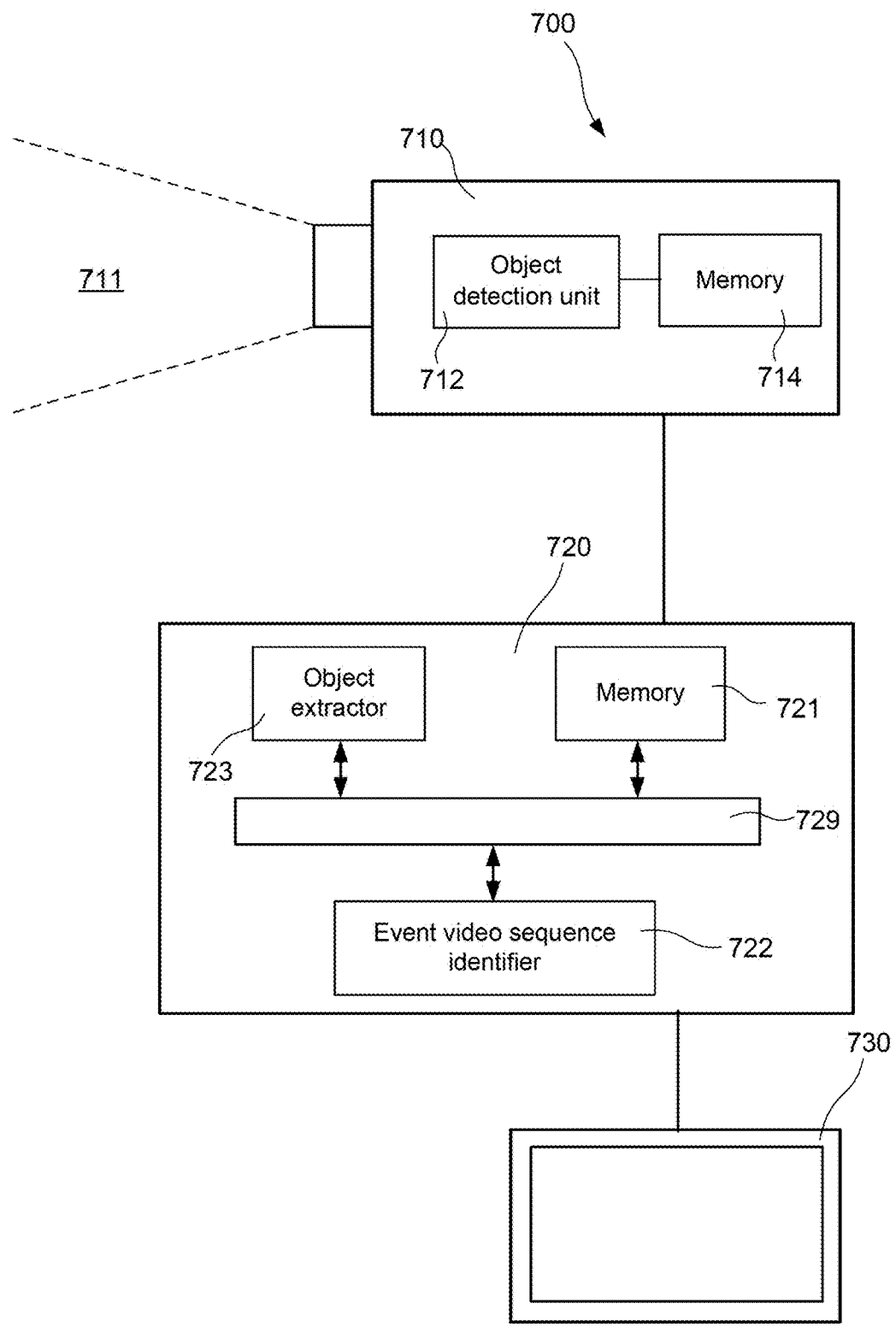
FIG. 7 is a block diagram of a monitoring system comprising a video camera and a video processing device.

According to the embodiment disclosed in connection with FIG. 7 the video camera 710 is a digital video camera. However, it should be realized that an analog video camera may also be used. In case the monitoring system 700 comprises an analog video camera, analog video frames are communicated from the analog video camera to an analog to digital converter (not shown), which operates to generate digital representations of the analog video frames for producing the source video sequence.

As the in FIG. 7 shown embodiment the video camera 710 may comprise an object detection unit 712. However, the object detection unit 712 may as alternatively or in combination be comprised in the video processing device 720. The object detection unit 712 may be hardware implemented. The object detection unit 712 may be implemented as a processor configured to run software, hence the object detection unit 712 may be software implemented. However, it is also realized that the object detection unit 712 may be implemented as a combination of hardware and software. The object detection unit 712 is configured to detect objects of interest in the source video sequence. As mentioned above, objects of interest may be objects of a specific type. Non-limiting examples of different types of objects are faces, humans, cars, license plates, etc. As an example the detection of objects of a specific type may be performed by analyzing the appearance, or appearance features of objects in the scene, such as by shape recognition. However, any conventional method for detecting objects of a specific type in a video sequence may be used. The object detection unit 712 may thus be configured in many different ways for detecting objects of a specific type; these different ways will not be discussed in more detail in this disclosure. As also have been discussed above, alternatively or in combination, object of interest may be objects moving in the scene depicted by the source video sequence. As an example the motion detection may be performed by comparing consecutive video frames, or comparing a video frame with a background image or model of the scene, to detect changes due to objects in motion. However, any conventional method for detecting moving objects in a video sequence, often referred to motion detection, may be used. The object detection unit 712 may thus be configured in many different ways for detecting moving objects; these different ways will not be discussed in more detail in this disclosure.

In addition to detecting objects of interest, the detected objects of interest may also be tracked from video frame to video frame to further verify that they in fact are objects of interest.

The object detection unit 712 is configured to store information pertaining to the detected objects of interest as object data. The object data may be stored as a metadata file. The metadata file may be stored in the memory 714 of the video camera and/or in the memory 721 of the video processing device 720. As mentioned above, object data of an object of interest may comprise any one of an object ID, information defining a position and size of the object (this information may e.g. be a bounding box), and a time stamp. The time stamp may comprise information about when the object of interest appears in the source video sequence. Alternatively or in combination, the time stamp may comprise information about when the object of interest disappears in the source video sequence. The object detection unit 712 may be configured to detect the objects of interest in real-time. The object detection unit 712 may be configured to compile and store the object data in real-time. Alternatively or in combination, the object detection unit 712 may be configured to detect the objects of interest from an already recorded source video sequence.

The video processing device 720 is configured to generate a summary video sequence from the source video sequence. In addition to the memory 721, the video processing device 720 comprises an event video sequence identifier module 722, an object extractor module 723 and a video frame renderer module 724. The modules 722, 723, 724 of the video processing device 720 may be implemented as software code run by a processing unit, as hardware implemented in the video processing device 720 or as a combination thereof. Moreover, modules 722, 723, 724 may be arranged to store and/or retrieve data from/on the memory 721. The memory 31 and the modules 722, 723, 724 are arranged to communicate with each other over the data bus 729.

The event video sequence identifier module 722 is configured to identify event video sequences in the source video sequence in accordance with any method disclosed above or below. In order to avoid undue repetition, reference is made to these passages in this disclosure.

The object extractor module 723 is configured to extract pixels belonging to objects of interest in accordance with any method disclosed above or below. In order to avoid undue repetition, reference is made to these passages in this disclosure.

The video frame renderer module 724 is configured to render video frames of the summary video sequence in accordance with any method disclosed above or below. In order to avoid undue repetition, reference is made to these passages in this disclosure.

The video processing device 720 may be configured to store the summary video sequence on the memory 721. Alternatively or in combination, the video processing device 720 may be configured to display the summary video sequence on a display 730 connected thereto. Alternatively, the camera 710 may process and generate the summary video sequence and transmit it to a client for viewing or storage. All the components of the video processing device 720 may hence also be included in the camera 710, the video processing device 720 then forming part of the camera 710.

Figure 8:
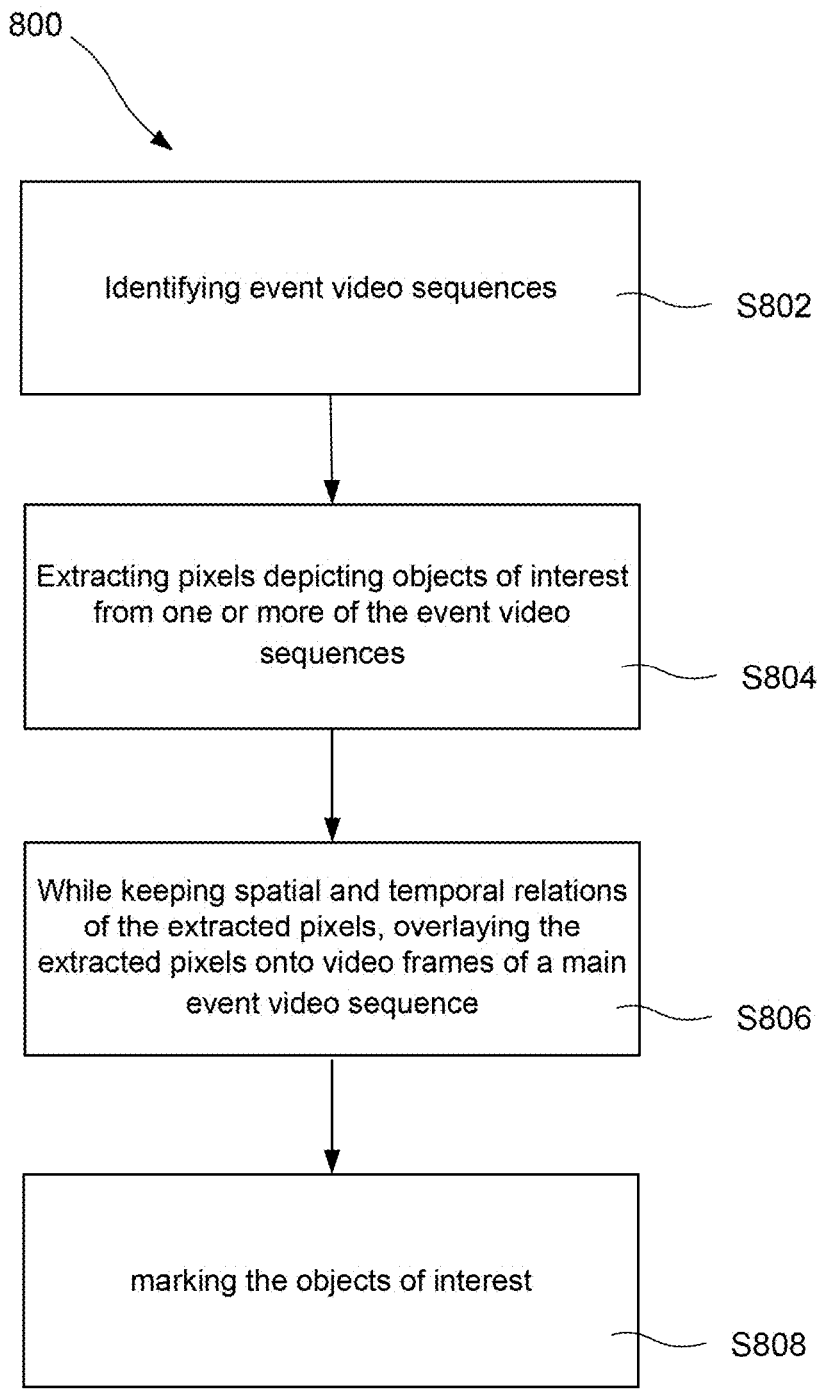
FIG. 8 is a block scheme of a method for generating a summary video sequence from a source video sequence.

In connection with FIG. 8 embodiments of the method 800 for generating the summary video sequence from the source video sequence will be discussed. The method comprises the following acts. The acts do not necessarily need to be performed in the listed order. Identifying S802, in the source video sequence, event video sequences, wherein each event video sequence comprises consecutive video frames in which one or more objects of interest are present. Extracting S804, from video frames of one or more event video sequences of the event video sequences, pixels depicting the respective one or more objects of interest. While keeping spatial and temporal relations of the extracted pixels as in the source video sequence, overlaying S806 the extracted pixels of the video frames of the one or more event video sequences onto video frames of a main event video sequence of the event video sequences, thereby generating the summary video sequence. The main event video sequence is different from the one or more event video sequences.

The method 800 may also comprise the act of marking S808 the objects of interest in the summary video sequence. Objects of interest from a first event video sequence are preferably marked differently than objects of interest from a second event video sequence. The first and second event video sequences are different event video sequences. The marking may comprises an outline enclosing pixels of the object of interest, wherein the outlines of objects of interest from the first event video sequence are different from the outlines of objects of interest from the second event video sequence.

The person skilled in the art realizes that the method and apparatus for generating a summary video sequence from a source video sequence by no means is limited to the embodiments described above. On the contrary, many modifications and variations are possible within the scope of the appended claims.

For example, since the method and apparatus for generating a summary video sequence from a source video sequence is built on object data, the summary video sequence may be customized by filtering the object data by for example size, region of interest, presence time in the source video sequence etc.

Moreover, a plurality of video source sequences may be processed using interconnected rules so that the corresponding summary video sequences may be viewed next to each other. This may for example be achieved by simultaneously generating a plurality of sub source video sequences. This may e.g. be made by using a camera with the ability to simultaneously produce a plurality of video sequences. Such a camera may for example be a camera configured to produce one video sequence in the visible range of light and one video sequence in the IR range of light. Alternatively or in combination, the simultaneously generation of a plurality of sub source video sequences may be performed by different cameras. The different cameras may e.g. be configured to capture video sequences of an outdoor or indoor room from different viewing angles. Then the source video sequence discussed above comprises the plurality of sub source video sequences. Moreover, in this case each event video sequence comprises a plurality of sub event video sequences. Further, each of the plurality of sub event video sequences comprises video frames from a corresponding one of the sub source video sequences. Then the above discussed act of identifying a specific one of the event video sequences is performed as long as there are one or more objects of interest in at least one of the sub source video sequences.

The number of concurrent objects of interest as a function of time shown in FIGS. 1-5 may be all detected objects of interest in the respective event video sequence. However, as has been discussed above the detected objects of interest may be filtered in one way or another. Hence, the number of concurrent objects of interest as a function of time shown in FIGS. 1-5 may alternatively be a filtered amount of detected objects of interest.

Additionally, variations to the disclosed embodiments can be understood and effected by the skilled person in practicing the method and apparatus for generating a summary video sequence from a source video sequence, from a study of the drawings, the disclosure, and the appended claims.

What is claimed is:

1. A method for generating a summary video sequence from a source video sequence, the method comprising:
   identifying, in the source video sequence, event video sequences, wherein each event video sequence comprises consecutive video frames in which one or more objects of interest are present;
   extracting, from video frames of one or more event video sequences of the event video sequences, pixels depicting the respective one or more objects of interest; and
   while keeping spatial and temporal relations of the extracted pixels as in the source video sequence, overlaying the extracted pixels of the video frames of the one or more event video sequences onto video frames of a main event video sequence acting as a background sequence, the main event video sequence being one of the event video sequences, thereby generating the summary video sequence.

2. The method according to claim 1, wherein the overlaying is subjected to a rule of keeping the number of objects of interest being present in each frame of the summary video sequence below a predetermined maximum number.

3. The method according to claim 1, wherein the overlaying is subjected to a rule of keeping a number of temporal and spatial collisions between objects of interests from different event video sequences below a predetermined maximum number.

4. The method according to claim 1, further comprising marking the objects of interest in the summary video sequence, wherein objects of interest from a first event video sequence are marked differently than objects of interest from a second event video sequence, wherein the first and second event video sequences are different event video sequences.

5. The method according to claim 4, wherein the marking comprises an outline enclosing pixels of the object of interest, wherein the outlines of objects of interest from the first event video sequence are different from the outlines of objects of interest from the second event video sequence.

6. The method according to claim 1, wherein the overlaying is performed by blending pixel data from the extracted pixels of the video frames of the one or more event video sequences with pixel data of video frames of the main event video sequence.

7. The method according to claim 1, further comprising identifying objects of interest in the source video sequence by motion detection and/or object type detection.

8. The method according to claim 1, wherein the one or more event video sequences are subsequent to the main event video sequence in the source video sequence.

9. The method according to claim 1, further comprising simultaneously generating a plurality of sub source video sequences, wherein the source video sequence comprises the plurality of sub source video sequences, wherein each event video sequence comprises a plurality of sub event video sequences, wherein each of the plurality of sub event video sequences comprises video frames from a corresponding one of the sub source video sequences, wherein the identifying a specific event video sequence is performed as long as there are one or more objects of interest in at least one of the sub source video sequences.

10. The method according to claim 1, wherein the act of overlaying is performed by overlaying the extracted pixels of the video frames of the one or more event video sequences onto complete video frames of the main event video sequence.

11. The method according to claim 1, wherein each event video sequence comprises consecutive video frames of the source video sequence in which one or more objects of interest are present, wherein one of the event video sequences comprises at least two objects of interest, and wherein pixels depicting the at least two objects of interest are extracted from video frames of the one or more event video sequences comprising at least two objects of interest.

12. A non-transitory computer readable recording medium having computer readable program code recorded thereon which when executed on a device having processing capability is configured to perform the steps of:
identifying, in a source video sequence, event video sequences, wherein each event video sequence comprises consecutive video frames in which one or more objects of interest are present;
extracting, from video frames of one or more event video sequences of the event video sequences, pixels depicting the respective one or more objects of interest; and
while keeping spatial and temporal relations of the extracted pixels as in the source video sequence, overlaying the extracted pixels of the video frames of the one or more event video sequences onto video frames of a main event video sequence acting as a background sequence, the main event video sequence being one of the event video sequences, thereby generating the summary video sequence.

13. A video processing device configured to generate a summary video sequence from a source video sequence, the video processing device comprising:
a memory configured to store the source video sequence; and
a processing unit configured to:
identify, in the source video sequence, event video sequences, wherein each event video sequence comprises consecutive video frames in which one or more objects of interest are present;
extract, from video frames of one or more event video sequences of the event video sequences, pixels depicting the respective one or more objects of interest; and
while keeping spatial and temporal relations of the extracted pixels as in the source video sequence, overlaying the extracted pixels of the video frames of the one or more event video sequences onto video frames of a main event video sequence acting as a background video sequence, the main event video sequence being one of the event video sequences, thereby generating the summary video sequence.

14. The video processing device according to claim 13, wherein each event video sequence comprises consecutive video frames of the source video sequence in which one or more objects of interest are present, wherein one or more of the event video sequences comprises at least two objects of interest, and wherein the object extractor module is configured to extract pixels depicting the at least two objects of interest from video frames of the one or more event video sequences comprising at least two objects of interest.

* * * * *